US010056593B2

(12) United States Patent
Park et al.

(10) Patent No.: US 10,056,593 B2
(45) Date of Patent: Aug. 21, 2018

(54) LITHIUM SULFUR BATTERY ANODE STRUCTURE INCLUDING CARBON COATING LAYER AND CARBON STRUCTURE LAYER IMMERSED WITH SULFUR

(71) Applicant: HYUNDAI MOTOR COMPANY, Seoul (KR)

(72) Inventors: Sang Jin Park, Bucheon-si (KR); Hee Yeon Ryu, Yongin-si (KR); Yoon Ji Lee, Bucheon-si (KR); Hee Jin Woo, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 526 days.

(21) Appl. No.: 14/569,532

(22) Filed: Dec. 12, 2014

(65) Prior Publication Data

US 2015/0311489 A1  Oct. 29, 2015

(30) Foreign Application Priority Data

Apr. 28, 2014 (KR) ........................ 10-2014-0051031

(51) Int. Cl.
| | |
|---|---|
| *H01M 2/16* | (2006.01) |
| *H01M 4/13* | (2010.01) |
| *H01M 4/38* | (2006.01) |
| *H01M 4/62* | (2006.01) |
| *H01M 4/66* | (2006.01) |

(Continued)

(52) U.S. Cl.
CPC ......... *H01M 2/166* (2013.01); *H01M 2/1673* (2013.01); *H01M 4/13* (2013.01);
(Continued)

(58) Field of Classification Search
CPC ............ H01M 4/70; H01M 4/38; H01M 4/13; H01M 2/166; H01M 2/1673
(Continued)

(56) References Cited

U.S. PATENT DOCUMENTS

| | | | |
|---|---|---|---|
| 2002/0106561 A1 | 8/2002 | Lee et al. | |
| 2011/0151335 A1* | 6/2011 | Deromelaere | ........ H01M 4/136 429/304 |

(Continued)

FOREIGN PATENT DOCUMENTS

| | | |
|---|---|---|
| JP | 2012-204332 A | 10/2012 |
| KR | 10-2005-0022566 A | 3/2005 |

(Continued)

OTHER PUBLICATIONS

Ahn et al., Machine translation of KR 2005-022567 A, Mar. 2005.*

*Primary Examiner* — Sean P Cullen
(74) *Attorney, Agent, or Firm* — McDermott Will & Emery LLP

(57) ABSTRACT

An anode structure of a lithium sulfur battery includes a sulfur anode laminated on an aluminum foil, and a carbon coating layer disposed between the sulfur anode and a carbon structure layer in which sulfur is immersed. The sulfur anode includes the sulfur, a conductor, and a binder. The carbon structure layer in which sulfur is immersed is a polyester (PE) separation membrane separated from a counter electrode. A loaded amount of sulfur within the anode structure is dispersed to the sulfur anode and the carbon structure layer in which the sulfur is immersed.

8 Claims, 4 Drawing Sheets

MIMETIC DIAGRAM OF
THE PRESENT INVENTION

ANODE STRUCTURE

(51) Int. Cl.
   *H01M 4/70* (2006.01)
   *H01M 4/02* (2006.01)
(52) U.S. Cl.
   CPC ............... *H01M 4/38* (2013.01); *H01M 4/70* (2013.01); *H01M 4/622* (2013.01); *H01M 4/623* (2013.01); *H01M 4/625* (2013.01); *H01M 4/661* (2013.01); *H01M 2004/021* (2013.01); *H01M 2004/027* (2013.01)
(58) Field of Classification Search
   USPC ...................................... 429/217, 218.1, 245
   See application file for complete search history.

(56) References Cited

U.S. PATENT DOCUMENTS

2012/0315545 A1* 12/2012 Son ..................... H01M 2/1673
429/246
2013/0224632 A1* 8/2013 Roumi .................. H01M 2/166
429/516
2014/0050973 A1* 2/2014 Manthiram ......... H01M 2/1646
429/188
2014/0255780 A1* 9/2014 Mikhaylik .......... H01M 2/1626
429/213
2014/0272545 A1* 9/2014 Saito .................... H01M 4/136
429/163
2015/0104690 A1* 4/2015 Xiao .................... H01M 2/145
429/145

FOREIGN PATENT DOCUMENTS

| KR | 2005-022567 A | * | 3/2005 |
| KR | 10-2006-0080782 A | | 7/2006 |
| KR | 10-0758383 B1 | | 9/2007 |
| KR | 10-2012-0131558 A | | 12/2012 |
| KR | 10-2013-0056731 A | | 5/2013 |
| WO | 2011/023110 A1 | | 3/2011 |

* cited by examiner

<EXISTING SULFUR ANODE STRUCTURE>

-- Prior Art --

LITHIUM SULFUR BATTERY ANODE STRUCTURE INCLUDING CARBON COATING LAYER AND CARBON STRUCTURE LAYER IMMERSED WITH SULFUR

CROSS-REFERENCE TO RELATED APPLICATION

This application claims under 35 U.S.C. § 119(a) the benefit of priority to Korean Patent Application No. 10-2014-0051031 filed on Apr. 28, 2014, the entire contents of which are incorporated herein by reference.

TECHNICAL FIELD

The present disclosure relates to an anode of a lithium sulfur battery loading sulfur dividedly into an existing anode structure and a carbon structure layer.

BACKGROUND

A lithium sulfur battery has a theoretical energy density of 2,600 Wh/kg, which is far higher than a lithium ion battery (theoretical an energy density of 570 Wh/kg, a current level of around 120 Wh/kg).

However, sulfur as an active material and $Li_2S$ as a product are all nonconductors, and therefore, energy capacity is reduced during discharge.

When a reaction area of sulfur within an electrode is not sufficiently secured, the sulfur utilization rate is reduced leading to the reduction in discharge capacity, and when $Li_2S$ is locally aggregated within an anode during discharge, the resistance within an electrode increases leading to the reduction in discharge capacity. Particularly, as the loading amount of sulfur for energy density increase becomes greater, and as the current density for output improvement increases, such phenomena are intensified.

However, a high sulfur loading electrode (8 mg/cm$^2$ or greater) is essential for storing a large amount of energy in a given space because batteries for electric vehicles (EV) need to have large absolute capacity. In addition, in order to satisfy the required output specifications, sufficient capacity (1,200 mAh/$g_{-o}$ or greater) needs to be obtained without discharge voltage reduction within an electrode even at high current density.

In developing lithium sulfur batteries with such properties, designing an anode structure so as to increase a reaction area of sulfur and evenly produce $Li_2S$ all over is very important in increasing energy capacity. Sulfur according to the prior art is highly loaded in an anode of a lithium sulfur battery.

Referring to FIG. 1, anode structures for lithium sulfur batteries having high current density by including highly loaded sulfur according to the prior art may be classified into 3 types as follows.

In type 1, a volume energy density increases due to an increase of clad sheet density by rolling, and therefore, an electrode manufacturing process is simple and enables mass production.

However, cell capacity is reduced due to a narrow reaction area of sulfur, and cell capacity and lifespan characteristics are reduced due to local aggregation of $Li_2S$. Moreover, the cell capacity and lifespan characteristics are reduced due to insufficient electrolyte replacement.

In type 2, cell capacity and lifespan characteristics are improved since electrolyte replacement is sufficient, and cell capacity is also improved since a reaction area of sulfur increases. However, the energy density is reduced since a thick and heavy carbon structure layer is used.

Lastly, in type 3, cell capacity and lifespan characteristics are improved since electrolyte replacement is sufficient, and cell capacity is also improved since the reaction area of sulfur increases. In addition, the energy density is improved compared to type 2, since type 3 is thinner than type 2. However, a volume energy density is reduced since rolling of the carbon structure layer is impossible, and the cell capacity and lifespan characteristics are reduced since $Li_2S$ is locally aggregated. Furthermore, mass production is difficult due to complicated processes.

SUMMARY OF THE DISCLOSURE

The present disclosure has been made in an effort to solve the problems of existing lithium sulfur battery anode structures described above. An aspect of the present inventive concept provides an anode structure enabling the rolling of a sulfur anode, having sufficient electrolyte replacement, and maintaining a high energy density without immersing excess sulfur.

According to an exemplary embodiment of the present inventive concept, an anode structure of a lithium sulfur battery including a sulfur anode laminated on an aluminum foil, and a carbon coating layer disposed between the sulfur anode and a carbon structure layer in which sulfur is immersed. The sulfur anode includes the sulfur, a conductor, and a binder. The carbon structure layer in which sulfur is immersed is a polyester (PE) separation membrane separated from a counter electrode. A loaded amount of sulfur within the anode structure is dispersed to the sulfur anode and the carbon structure layer in which the sulfur is immersed.

BRIEF DESCRIPTION OF THE DRAWINGS

The above and other features of the present inventive concept will now be described in detail with reference to certain exemplary embodiments thereof illustrated in the accompanying drawings which are given hereinbelow by way of illustration only, and thus are not limitative of the present invention.

Figure 1:
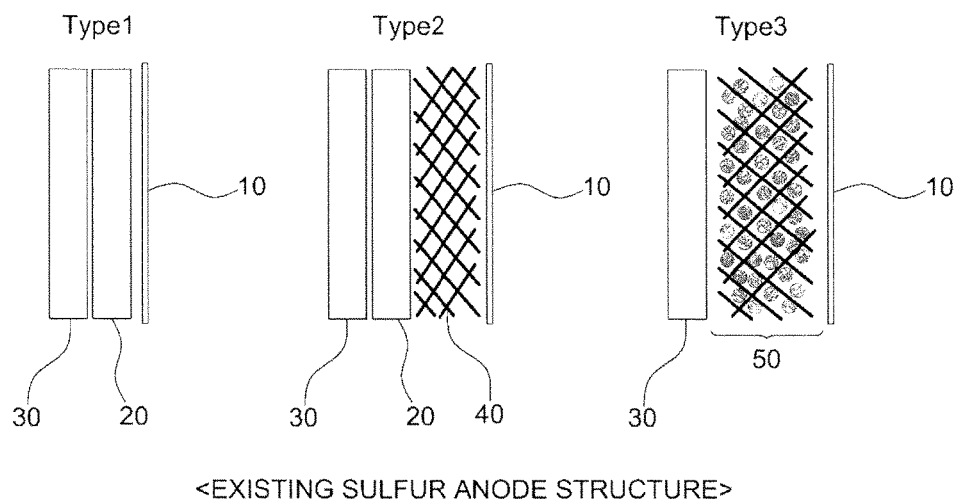
FIG. 1 is a mimetic diagram of an existing anode structure of a lithium sulfur battery that may be classified into 3 types.
Figure 2:
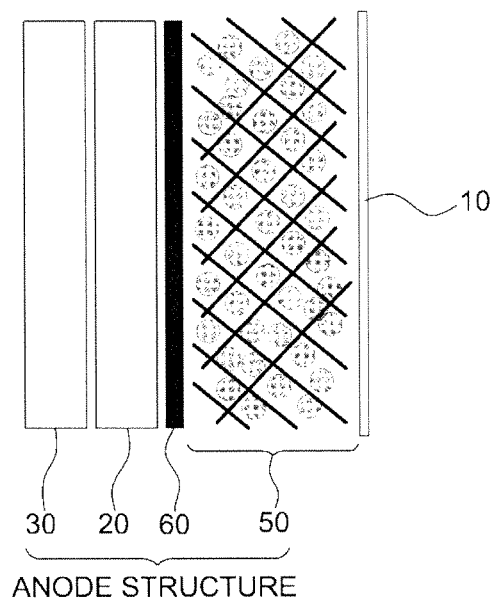
FIG. 2 is a mimetic diagram of an anode structure of a lithium sulfur battery of the present inventive concept.

It should be understood that the appended drawings are not necessarily to scale, presenting a somewhat simplified representation of various features illustrative of the basic principles of the disclosure. The specific design features of the present inventive concept, as disclosed herein, including, for example, specific dimensions, orientations, locations, and shapes will be determined in part by the particular intended application and use environment.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents, and other embodiments, which may be included within the spirit and scope of the invention as defined by the appended claims.

The present disclosure provides an anode structure of a lithium sulfur battery including a sulfur anode laminated on aluminum foil, and a carbon coating layer present between the sulfur anode and a carbon structure layer in which sulfur is immersed. The sulfur anode includes sulfur, a conductor, and a binder. Carbon structure layer in which sulfur is immersed is a polyester (PE) separation membrane 10 separated from a counter electrode, and a loaded amount of sulfur within the anode structure is dispersed to the sulfur anode and the carbon structure layer in which sulfur is immersed The sulfur anode 20 may be densely manufactured by being rolled to have a clad sheet density of 1 g/cc or greater (2 g/cc or less).

The conductor may be one or more types selected from the group consisting of graphite, SUPER C (product of TIMCAL Ltd.), vapor grown carbon fibers, KETJEN BLACK, DENKA BLACK, acetylene black, carbon black, carbon nanotubes, multi-walled carbon nanotubes, and ordered mesoporous carbon. The binder may be one or more types selected from the group consisting of polyvinyl acetate, polyvinyl alcohol, polyethylene oxide, polyvinylpyrrolidone, polystyrene, polyvinyl ether, polymethylmethacrylate, polyvinylidene fluoride, a polyhexafluoropropylene-polyvinylidene fluoride copolymer, polyethylacrylate, polytetrafluoroethylene, polyvinyl chloride, polyacrylonitrile, carboxylmethylcellulose (CMC), styrenebutadiene rubber (SBR), and derivatives, mixtures and polymers thereof. However, the conductor and the binder are not limited thereto, and include all constitutions capable of being considered to be used in the technology field of the present disclosure.

The carbon coating layer 60 may be manufactured as one or more types selected from the group consisting of SUPER C, vapor grown carbon fibers, KETJEN BLACK, DENKA BLACK, acetylene black, carbon black, carbon nanotubes, multi-walled carbon nanotubes, and ordered mesoporous carbon. The carbon structure layer 40 in which sulfur is immersed may form a structure layer 40 with one or more types of carbon materials selected from the group consisting of carbon fiber, KETJEN BLACK, and acetylene black.

As a loading amount of sulfur in the anode structure, the sulfur anode 20 may contain 0.5 to 7.0 mg/cm$^2$ of sulfur, and the carbon structure layer 40 in which sulfur is immersed may contain 0.5 to 7.0 mg/cm$^2$ of sulfur, since the sulfur may be loaded dividedly into the sulfur anode 20 and the carbon structure layer 40 in which sulfur is immersed.

Hereinafter, the present disclosure will be described in more detail.

The anode structure of the present disclosure loads sulfur dividedly into the anode electrode 20 and the carbon structure layer 40 which becomes sulfur-loaded carbon structure layer 50 in order to increase the utilization rate of sulfur as an active material, and prevent the local aggregation of Li$_2$S as a product.

The anode structure of a lithium sulfur battery of the present disclosure may roll or densely manufacture the sulfur anode 20 (clad sheet density 1 g/cc or greater, 2 g/cc or less), and therefore, a volume energy density of a cell may be improved.

In addition, Li$_2$S may be produced by dividing into the sulfur anode 20, the carbon coating layer 60 and the sulfur-loaded carbon structure layer 50, therefore a shuttle phenomenon due to the Li$_2$S reproduction is reduced.

The sulfur-loaded carbon structure layer 50 may carry out a role of electrolyte replacement, and therefore, a process becomes simple since a large amount of sulfur needs not be immersed in the sulfur-loaded carbon structure layer 50.

EXAMPLES

Hereinafter, the present disclosure will be described in more detail with reference to the following examples, however, these examples are for illustrative purposes only, and do not limit or restrict the scope to be protected of the present disclosure.

Figure 3:
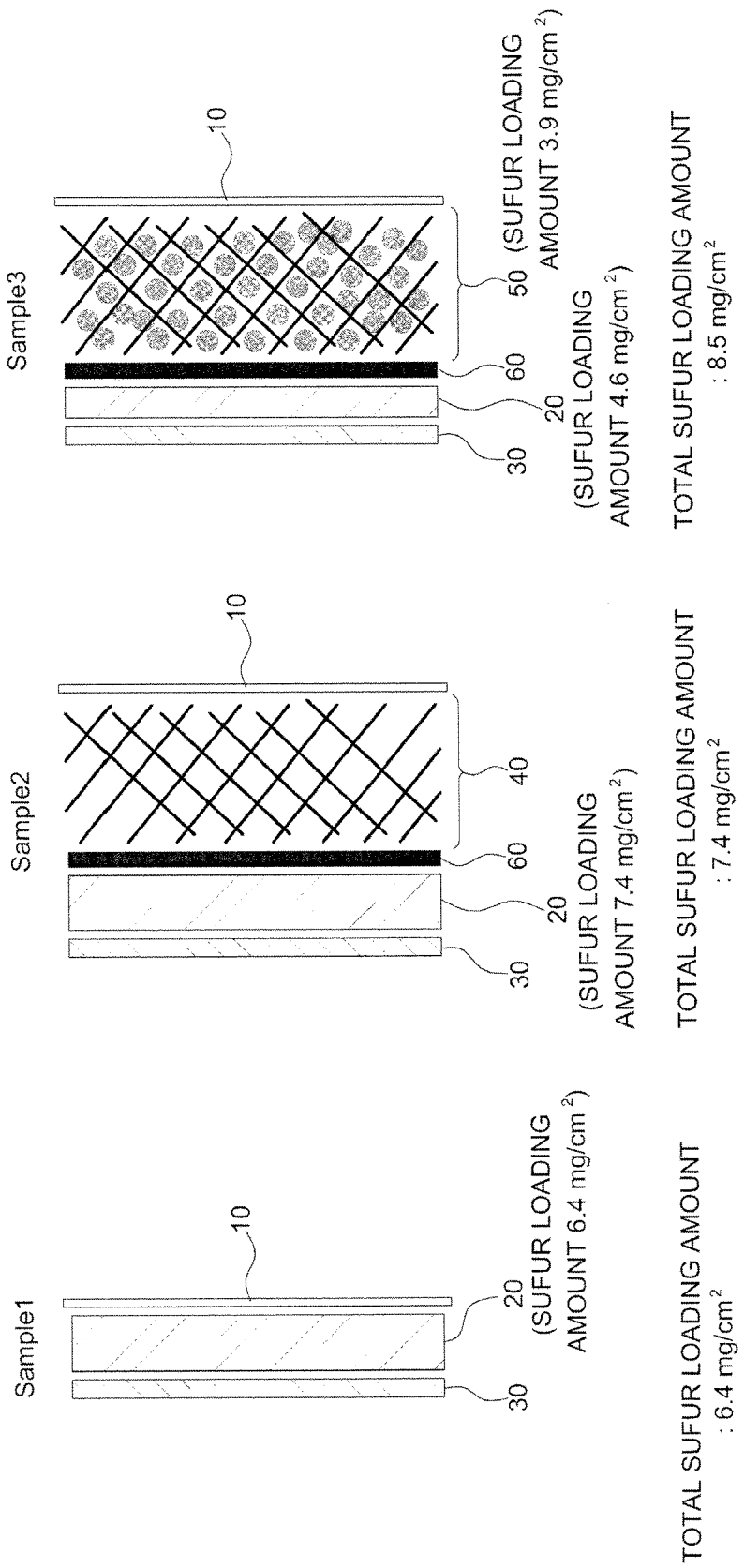
FIG. 3 is a mimetic diagram of a lithium sulfur battery structure of Examples 1 to 3.

Example (Refer to FIG. 3)

Sample #1 is manufactured by coating a uniformly mixed slurry as anode 20 (a conductor, sulfur, a binder, a solvent) on an Al foil 30, and then drying, which is a basic method for manufacturing an anode for a lithium sulfur battery.

Sample #2 is prepared by manufacturing the anode 20 in the same manner as in Sample #1, and then placing the carbon coating layer 60-integrated carbon structure layer 40 (ex. GDL) on the anode 20.

Sample #3 is manufactured by coating a certain amount of the uniformly mixed anode slurry as anode 20 on the Al foil 30, which is the same as Sample #1, and by immersing the remaining slurry in the inside of GDL.

Figure 4:
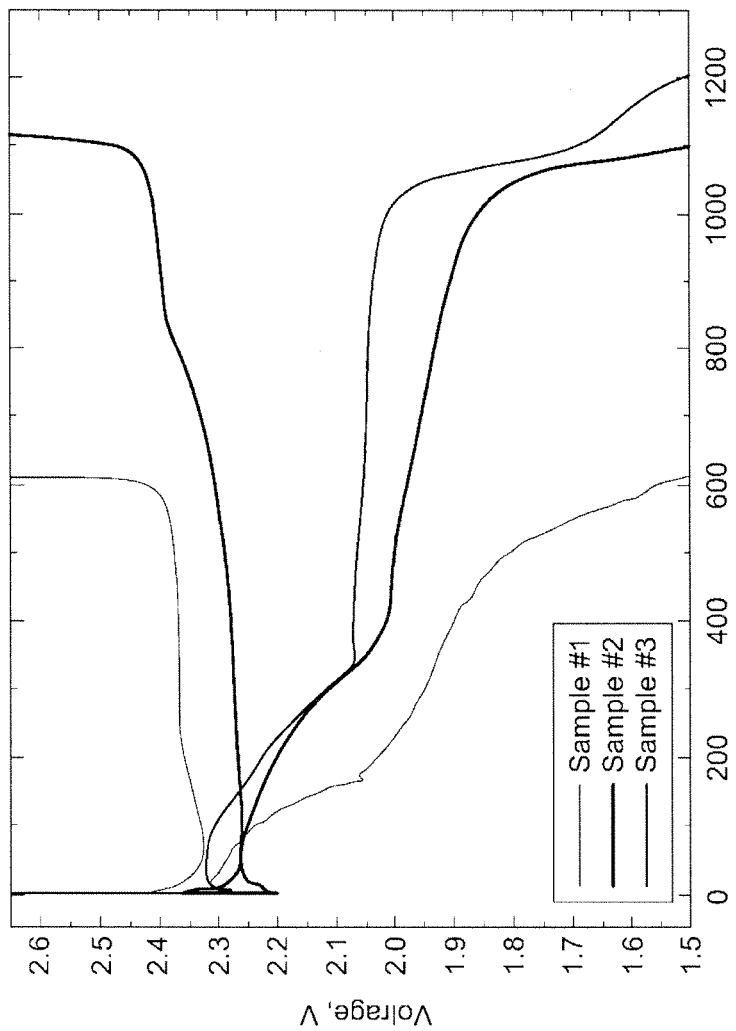
FIG. 4 is a graph of primary charge and discharge curve of a coin cell using anodes of Examples 1 to 3.

Test Results (Refer to FIG. 4)

Sample #1 did not effectively replace the electrolyte even with a sulfur loading amount of 6.4 mg/cm$^2$, which is the lowest amount of the samples, since the carbon structure layer 40 is not present, and exhibited low discharge voltage and capacity due to the insufficient reaction area of sulfur. Therefore, an electrode having a sulfur loading amount of 8.0 mg/cm$^2$ or greater is expected to exhibit a lower voltage and capacity.

In sample #3, in which sulfur was loaded dividedly into the anode 20 and the carbon structure layer 40 which become sulfur-loaded carbon structure layer 50, a capacity of 1,271 mAh/g$_{-o}$ was obtained when discharging with a high current density of 200 mA/g$_{-o}$. In addition, a higher discharge pressure was exhibited compared to sample #2, in which a large amount of sulfur was only loaded into the anode 20. This shows that more sulfur is capable of participating in the reaction as the amount of sulfur contacting the electrolyte increases. Furthermore, this demonstrates that the resistance within the anode is reduced during discharge by the Li$_2$S being evenly produced all over instead of locally. As a conclusion, energy capacity may be improved by dividing the electrode by function and loading sulfur dividedly.

The anode structure of a lithium sulfur battery of the present invention may roll or densely manufacture the sulfur anode 20 (clad sheet density 1 g/cc or greater, 2 g/cc or less), therefore, a volume energy density of a cell may be improved.

In addition, Li$_2$S may be produced by dividing into the sulfur anode 20, the carbon coating layer 60 and the sulfur-loaded carbon structure layer 50, and therefore, a shuttle phenomenon due to the Li$_2$S reproduction is reduced.

The sulfur-loaded carbon structure layer 50 may carry out the role of electrolyte replacement, and therefore, the process becomes simple since a large amount of sulfur needs not be immersed in the sulfur-loaded carbon structure layer 50.

What is claimed is:

1. An anode structure of a lithium sulfur battery comprising:
   an aluminum foil;
   a sulfur anode disposed and laminated on the aluminum foil;
   a carbon coating layer disposed on the sulfur anode; and
   a carbon structure layer disposed on the carbon coating layer,
   wherein the sulfur anode includes a first sulfur, a conductor, and a binder,
   a second sulfur is immersed in the carbon structure layer, and
   a loaded amount of sulfur within the anode structure is dividedly dispersed to the sulfur anode and the carbon structure layer.

2. The anode structure of claim 1, wherein the sulfur anode is rolled to have a clad sheet density of greater than or equal to 1 g/cc and less than or equal to 2 g/cc.

3. The anode structure of claim 1, wherein the sulfur anode contains 0.5 to 7.0 mg/cm$^2$ of the first sulfur.

4. The anode structure of claim 1, wherein the conductor is one or more types selected from the group consisting of graphite, vapor grown carbon fibers, acetylene black, carbon black, carbon nanotubes, multi-walled carbon nanotubes, and ordered mesoporous carbon.

5. The anode structure of claim 1, wherein the binder is one or more types selected from the group consisting of polyvinyl acetate, polyvinyl alcohol, polyethylene oxide, polyvinylpyrrolidone, polystyrene, polyvinyl ether, polymethylmethacrylate, polyvinylidene fluoride, a polyhexafluoropropylene-polyvinylidene fluoride copolymer, polyethylacrylate, polytetrafluoroethylene, polyvinyl chloride, polyacrylonitrile, carboxylmethylcellulose (CMC), styrenebutadiene rubber (SBR), derivatives, and mixtures thereof.

6. The anode structure of claim 1, wherein the carbon coating layer is one or more types selected from the group consisting of vapor grown carbon fibers, acetylene black, carbon black, carbon nanotubes, multi-walled carbon nanotubes, and ordered mesoporous carbon.

7. The anode structure of claim 1, wherein the carbon structure layer in which sulfur is immersed forms a structure layer with one or more types of carbon materials selected from the group consisting of carbon fiber and acetylene black.

8. The anode structure of claim 1, wherein the carbon structure layer in which the second sulfur is immersed contains 0.5 to 7.0 mg/cm$^2$ of the second sulfur.

* * * * *